Patented July 6, 1943

2,323,336

UNITED STATES PATENT OFFICE 2,323,336

RUBBER AND ASPHALT CEMENT AND ARTICLE COMPRISING SAME

Earl S. Knorr, Detroit, Mich., assignor to Minnesota Mining & Manufacturing Company, St. Paul, Minn., a corporation of Delaware No Drawing. Application May 6, 1940,
Serial No. 333,687

11 Claims. (Cl. 260—58)

This invention relates to adhesive compositions and to articles made therewith. More particularly it concerns compositions comprising rubber or equivalent and a solvent, with which certain other ingredients such as asphalt or the like may also be associated, as will be seen from the more detailed discussion presented hereinafter.

In a general way, the present invention is somewhat related to the disclosure of Zimmerli et al. Patent No. 1,937,861, insofar as it involves the use of rubber or reclaimed rubber and a solvent, but differs from the latter in a number of important respects as will be seen from the application as a whole. For one thing, in the preferred aspect of my invention rosin and rosin soaps are completely or substantially completely absent; or at least are not present to any important extent as compared with the Zimmerli et al. composition. Important results accomplished by compositions of the present invention, which avoid the need for and/or obviate the use of rosin and rosin soaps, will be described more in detail hereinafter but include, for example, the production of adhesive compositions having much better tack and having definitely improved transferability to other surfaces, for a given softening point, than do adhesive compositions of, for example, the type set forth in the aforementioned Zimmerli patent.

It is an object of the present invention to produce an adhesive composition, containing rubber or reclaim, of improved heat resistance. A further object is to provide a cement of improved heat resistance which is also free or substantially free of the tendency of various rubber-rosin cements to form a skin on the surface thereof when drying. A further object is to produce a solvent type rubber cement which has improved drying characteristics due, among other things, to the presence of water. A further object is to provide an economical cement or adhesive. A still further object is to provide a rubber-containing cement or adhesive which, for a predetermined tack and transferability, will have an increased melting point or increased heat resistance in the form of the final dried film, as compared with straight rubber-rosin solvent type cements heretofore employed. Another object is to provide a cement having an improved wet strength. A further object is to provide a composite article united together by an adhesive or cement composition of the type herein described. A further object is to improve the construction and durability of automobile bodies and to minimize or to substantially eliminate vibrations therein. These and other objects and advantages will appear from the application taken as a whole.

The following formula will illustrate a preferred embodiment of the present invention:

| | Pounds |
|---|---|
| Red inner tube reclaimed rubber | 900 |
| Steam refined petroleum residual asphalt (melting point approximately 140° F., ball and ring method) | 900 |
| Water | 86 |
| 50% aqueous NaOH solution | 36 |
| Denatured ethyl alcohol | 120 |
| Petro-benzol (a petroleum distillate, having an initial boiling point of 140° F. and an end boiling point of 210° F.) | 1746 |

The composition of the above formula may, for example, be compounded in the following manner. The reclaimed rubber may be first plasticized on a rubber mill and then placed in a hot mogul or Werner-Pfleiderer type mixer, the mixer being heated by admitting steam under a pressure of about 10 lbs. per square inch, gauge, to the jacket thereof. With the mixer in motion, the asphalt may be added slowly to the reclaim. When all of the asphalt has been added and the batch is smooth, the jacket steam may be shut off and then the caustic soda solution may be added, all at once or in increments. Next, one-fourth of the petro-benzol may be added and when the mix is smooth the alcohol may then be added and the agitation continued. When the mix is again smooth, another one-fourth of the petro-benzol may be added and, when a smooth mix is again attained, the water may be added, with continued mixing. Next the balance of the petro-benzol may be added and the mixing continued until the batch is uniform.

The composition of the above formula is a valuable adhesive for use as a roof pad cement, for example, in the construction of automobile bodies, but also has been employed successfully for a number of other uses, for example in attaching and holding the burlap-like material to the inside of trunk compartments of automobile bodies, in installing silencing pads in calculating or business machines, and attaching insulation pads to metal, enamel or other surfaces in making cabinets or coolers or refrigerators. The above illustrated cement is also useful, for example, for attaching silencer pads or similar elements to various other steel, metal or like surfaces, for example to the deck lids or cowl panels of automobiles. Various types of silencer pads have been used, one illustration being a silencer pad which is made up of a layer of blue wadding (which is a fibrous, pulpy sort of material) between two sheets of creped Kraft paper. The materials are held together by stitching at intervals of about 4 inches. In attaching such pads to the steel roof of an automobile body it will be noted that the adhesive bond is made between the sheet of creped paper and the metal. This creped paper does not present a smooth surface and has heretofore presented substantial difficulties in adhesion, particularly in securing adequate contact between the cement or adhesive and the paper. The matter of securing adequate contact is in part dependent on the property of transferability of the cement.

Attempts have been made to employ various rubber-rosin adhesives or cements in attaching such silencer pads to the steel roofs and other portions of automobile bodies but such compositions had a number of undesirable characteristics. For example, the adhesive did not have sufficient strength at elevated temperatures to hold the silencer pads in place and the drying characteristics of the adhesive were unsatisfactory for the production line of an automobile body factory, such prior adhesives allowing only a very short time in which the silencer pad could be applied while still securing adequate bonding. If the pad was applied too soon after spraying such prior cements onto the metal, such cements would fail to hold the pad in place as the bond produced by the wet cement was too weak to support the pad. If such cements were allowed to dry a little too long, the cement would not wet the paper properly and would fail to adhere to the pad. As will be readily understandable, this more or less critical requirement with respect to the exact amount of drying time allowed for such prior cements, before application of the silencer pads, did not lend itself satisfactorily to commercial production conditions.

The illustrative composition hereinabove set forth has sufficient heat resistance to hold the pads in place at temperatures up to 250° F. and higher and also is a cement which will allow a considerable variation in the elapsed time between spraying the same onto the metal surface and applying the silencer pads thereon, while still producing good adhesion of the pads to the metal or like surfaces.

A cement to be used as a roof pad cement and for other analagous purposes should advantageously: (1) Quickly develop a high wet strength; (2) Should have a fairly high melting point or softening point (The above composition has a softening point of 220° F. to 250° F. or higher as determined by a test employed in the laboratory of Minnesota Mining & Manufacturing Company in which a strip of strong paper is adhesively joined or bonded to a steel panel with the cement to be tested and the panel and the adhesively joined strip, after drying of the cement are placed vertically, i. e. suspended, in an oven with a 500 gr. weight on the paper strip, the vertical dimension of the adhesive bond being 1 inch and the horizontal dimension thereof, and of the paper strip, being ½ inch, making the area of the bonded surface ½ square inch. As the oven temperature is gradually increased, that temperature at which the 500 gram weight falls, due to the softening of the cement bond, is taken as the melting point (or softening point) of the cement. The temperature of the oven is raised 10° centigrade every 15 minutes); and (3) the cement should retain its tack for at least several minutes so that a bond can be formed with the adhesive conveniently under varying commercial conditions.

The above illustrated composition has a number of important characteristics which are different from those of rubber-resin solvent type cements such as have heretofore been employed commercially.

(1) For example, for a given softening point, such rubber-resin cements of the prior art have very much less tack and also have an inferior transferability to another surface, as compared with the composition hereinabove illustrated. "Transferability" refers to the capability of a cement to "wet" a surface to which it is desired that it adhere, e. g. a silencer pad such as hereinabove described, or another metal, wooden, resin, etc. surface.

(2) A composition such as hereinabove illustrated is softer and more elastic in the form of the final dried film than are rubber-resin cements of the prior art, known to me, in which rosin is employed in the same proportion to rubber as is asphalt or equivalent in the composition hereinabove illustrated.

(3) For a given tack and transferability, such as is possessed by the composition hereinabove illustrated, rubber-rosin solvent type cements of the prior known art known to me would have a substantially lower melting point, i. e. would not have as good heat resistance in the form of the final dried film as would the cement composition hereinabove illustrated.

(4) The composition hereinabove illustrated has a greater wet strength than rubber-rosin cements of the prior art known to me.

(5) The composition hereinabove illustrated loses solvent more uniformly throughout the depth of the cement film, when the same is undergoing drying or setting, than do ordinary rubber-rosin cements. The caustic soda and asphalt seem to contribute to this property, in combination with such other ingredients as, for example, those illustrated.

(6) Successful bonds can be made with the cement compositions herein illustrated over a much longer period of time than with rubber-rosin solvent type cements heretofore known. For example, a bond can be made with a film of the cement composition hereinabove illustrated over a period of about eight (8) minutes, whereas, for a cement of a comparable melting point composed of previously known rubber-rosin solvent types of cement and under comparable atmospheric conditions (e. g. room temperatures and 60% relative humidity), the time during which the bond can be made is much shorter. It will be understood that bonds can be made over a longer period of time in a cool and/or humid atmosphere, whereas the time is reduced somewhat in a hot and/or arid atmosphere. Bonding periods of 5 to 10 minutes, e. g. in excess of 6.5 minutes, under normal temperatures and humidity conditions as above indicated (i. e. about 70° F. and 60 per cent R. H.) in bonding porous or absorptive elements, such as roof pads as above described, to a metal or like smooth surface, are common with the compositions herein defined.

It seems probable that the alkali hydroxide, e. g. caustic soda, or water, or both, or these ingredients in connection with the alcohol or equivalent, when combined with the other ingredients, explain the improved tack and transferability of the composition hereinabove illustrated, and also explain or partially explain or account for other important qualities of the above composition over ordinary rubber-rosin and/or rubber-rosin soap compositions of the type heretofore known. The sodium hydroxide solution, or equivalent, evidently improves the heat resistance of the composition, in the form of the final dried film, without adversely affecting the tack of the cement when applied; whereas, in significant contrast, sodium hydroxide, if added to an ordinary rubber-rosin type composition, such as defined in the Zimmerli patent above referred to, would very adversely affect the tack of such rubber-rosin composition.

While the formula given above illustrates a specific choice of ingredients and specific illustrative proportions thereof, it will be understood that I do not intend to be limited either to the specific ingredients nor to the specific proportions illustrated and contemplate variations and embodiments within the scope of the application as a whole, taken in the light of the prior art. For example, where a melting point of the final dried film lower than that provided by the above composition is acceptable, higher percentages of asphalt may be used. Illustratively, the asphalt may be present to the extent of 1½ times that of the reclaimed rubber. Even 1.75 times or twice as much asphalt as reclaimed rubber has been used, but the melting point of the resulting cement, with such high proportions of asphalt of a melting point of the order of that illustrated, are quite low and, in fact, too low for advantageous use as a roof pad cement, or for like purposes where good heat resistance and high strength and good tack retention are desired, among other properties. However such a product is suitable where only relatively low temperatures are encountered.

On the other hand, reclaimed rubber may be employed to the extent of 1.25 or 1.5 times or more of that of the asphalt. Still wider variations in the rubber and asphalt content of my adhesive compositions may be made where the same is controlled in view of the use or uses which the resulting adhesive or cement is intended to serve.

The caustic soda may be replaced by other equivalent alkali material and the proportion of caustic soda may be varied considerably. In the specific formula hereinabove set forth, if the caustic soda is entirely eliminated, the resulting composition will have a melting point (in the form of the final dried film) of about 50° C., whereas, with the caustic soda present to the extent indicated the melting point, or rather the softening point (determined according to the test above generally described, or any equivalent test) is greatly increased and, for the specific composition shown, is approximately 108° C., or somewhat higher, a very surprising difference in melting points.

In place of the specific rubber material given in the above illustrative composition (which may be an alkali reclaim), other rubber materials may be employed in my invention. For example, gray inner tube reclaim may be employed, whole tire reclaim, suitably refined, may be used, or latex crepe and/or smoke sheet can be employed; also various mixtures of these materials, including mixtures of raw and reclaimed rubber, e. g. with the raw rubber present to a similar or somewhat greater or somewhat less extent than the reclaim, are contemplated. However, ordinarily, reclaimed rubber is preferred over various forms of raw rubber and tube reclaims are preferred over most whole tire reclaims. Where some form of raw rubber is employed, a suitable tack producer, e. g. a substantially neutral ester gum or other suitable material known in the art, is ordinarily employed therewith.

In place of the particular asphalt given in the above formula, it will be evident that other types of asphalt may be employed, but it will be noted that the softening point of the cement will be influenced somewhat by the softening point of the asphalt or equivalent. In place of the asphalt specifically illustrated, certain so-called "albino asphalts," now available commercially from petroleum refiners, e. g. Shell Petroleum Company, may be used, especially where it is desired to avoid the extremely dark color occasioned by the use of conventional asphalts. These albino asphalts are some times referred to as petroleum resins but it will be understood that they are primarily hydrocarbon products as distinguished from abietates, rosinates and comparable resin materials, which, for example, have a relatively high saponification number as compared with asphalt. It will also be understood that other suitable hydrocarbon and/or bituminous materials, which are not appreciably affected by sodium hydroxide or the equivalent may be used in place of the specific asphalt material above illustrated.

Where desired, a material derived from asphalt by removing some or all of the oils and/or some or all of the asphaltenes therefrom may be used as a softening agent for the rubber and as a modifier for the ingredients of the mix as a whole.

Other materials having a relatively low saponification number compared with rosin and other natural resins are also contemplated, whether made synthetically or selected or derived from naturally occurring materials. For example, relatively saturated polymers of oxygen and/or sulfur derivatives of various unsaturated terpenes and/or naphthylenes, of suitable softening point and compatible with rubber or reclaim may be used.

The amount of water disclosed in the above composition may be varied within substantial limits and even may be dispensed with under certain circumstances. However it is to be observed that the water present influences the properties of the cement or adhesive, e. g. has an important bearing on the tack retention properties and transferability of the cement above illustrated and also has an important effect on the drying or setting of a film of such a composition. The good viscosity ageing properties possessed by the above cement are also believed to be attributable, in an important measure, to the water content of the cement. The differences in viscosity ageing of a cement, such as above illustrated, caused by the presence of water are remarkable. In a rubber-asphalt solvent cement without water the viscosity increased from 6.5 to 64 (MacMichael viscosimeter, No. 26 wire) in thirty (30) days whereas with water present an otherwise comparable cement only rose from 6.5 to 11 in viscosity during the same period of time. While the water content of the above composition may be varied within a wide range, for example from half, or less, to twice, or more, of that shown in the above formula, it will be realized that if the quantity of water is reduced too far, the tack retention, transferability, and viscosity ageing properties will be adversely affected. On the other hand, if the water content is increased very greatly, the resulting cement will be slower drying and will have a proportionately lower solids content.

The alcohol of the above formula can be varied within wide limit or dispensed with, its main function being to lower the initial viscosity of the cements for a given solids content, i. e. to minimize or prevent gel structure in the finished adhesive composition; in other words, to improve or increase the flow characteristics of the adhesive for a given viscosity thereof measured by dynamic methods. In place of denatured ethyl alcohol, various higher alcohols such as amyl and butyl alcohols and certain esters such as ethyl acetate and amyl acetate may be employed to produce an effect similar to that provided by the ethyl alcohol of the above formula; however, these compounds are, for most purposes, less desired than ethyl acohol, because of cost of the same, lower efficiency thereof, or for other reasons.

It will be seen that the function of the petro-benzol is that of a solvent for the rubber and asphalt ingredients. The drying characteristics of the cement may be controlled within limits by changing the boiling range of this hydrocarbon solvent. Various other organic solvents may, of course, also be used, including ordinary gasoline. However, since this material is simply a solvent vehicle for the cement composition and since it largely evaporates during the drying of the cement film or coating, it will be evident that this material should be chosen with due consideration for economy.

I have also made compositions of the general type above described except that no asphalt was used at all, that is, a composition comprising reclaimed rubber, alcohol, water and caustic soda plus gasoline solvent. The sodium hydroxide of such composition increased the softening point of the resulting dried film from 141° C. to 163° C., as compared with a like composition with sodium hydroxide eliminated. On the other hand, where ordinary asphalt has been employed by me in the absence of rubber, the sodium hydroxide seems to have substantially no effect on the melting point or softening point of the dried film of the resulting composition. However, the effect of sodium hydroxide or equivalent on a composition comprising both rubber and asphalt is even more striking than on compositions containing rubber in the absence of asphalt. In compositions of the type hereinabove illustrated, with increases in the rubber to asphalt ratio, normally the amount of sodium hydroxide employed may be somewhat increased. The melting point or softening point of the composition set out in the formula hereinabove given, in the form of the final dried film, would be further increased by adding still more sodium hydroxide, e. g. by doubling the amount of the sodium hydroxide. However, the sodium hydroxide is normally not employed in excess of 5 percent of the weight of the rubber in the adhesive composition. On the other hand, the melting point would be decreased, other factors being consistent, by decreases in the amount of sodium hydroxide. A beneficial improvement in the softening point or melting point in the final dried film would still be obtained if, for example, one-fourth as much sodium hydroxide were used as is called for in the above formula. Thus, as will be seen, the alkali hydroxide is normally present within the range of 0.5 to 5 percent by weight of the rubber in the adhesive composition, in preferred embodiments of my invention. However, the sodium hydroxide or equivalent would of course, not be employed in such unduly high proportion as to disadvantageously affect the water-resistance, adhesion or other properties of the final dried film of the cement.

Hydrated lime and magnesia and such materials are not equivalents of alkali hydroxide, e. g. sodium hydroxide, in the compositions of the present invention.

Among other factors hereinabove pointed out, although most prior art patents relating to solvent type rubber cements apparently contemplate the use of rosin or comparable resins or resin soaps, which are relatively expensive compared with asphalt, the present invention provides compositions that need not and ordinarily do not contain any of such relatively expensive resins whatever. Moreover special advantages are attained by avoiding the use of such materials, or of large or substantial amounts thereof. It is also to be observed that preferred compositions of the present invention combine a number of the advantages of solvent type cements with other advantages of dispersion type cements.

An example of another formula, used as a roof pad cement in the construction of automobile bodies but which, however, is not nearly as satisfactory as the compositions hereinabove described is as follows:

| | Pounds |
|---|---|
| Red inner tube reclaimed rubber | 600 |
| Limed rosin (approximately 4% lime used in treating the rosin) | 225 |
| Dixie clay (a South Carolina kaolin clay) | 412 |
| #1 Special "Korite" asphalt (a brown residual petroleum asphalt having a melting point or softening point of approximately 200° F., Ball & Ring method) | 300 |
| Ethyl alcohol | 49 |
| Petro-benzol | 1930 |

This last mentioned formula is inferior to the compositions previously described hereinabove, among other things, in that:

(1) The cement does not have sufficient strength at elevated temperatures, in the form of the final dried film, to hold silencer pads in place on automobile bodies; and (2) The drying characteristics of this last mentioned adhesive are not nearly as advantageous as those of the compositions hereinabove previously discussed, and allow a relatively short time in which the pad can be applied to the roof or metal surface to which it is to be adhesively joined. If a silencer pad is applied too soon after spraying the cement, illustrated in the formula last given, there is a tendency of the bond to fail because the cement has not developed a sufficient wet strength and is too weak to support the pad in place. On the other hand if the cement of the last illustrated composition is allowed to dry a little too long before a silencer pad or the like is applied thereto, the cement will not properly wet or adhere to the latter and hence will not provide as strong a bond as is desired.

While I have defined preferred embodiments and preferred variations of my invention in considerable detail, I do not intend to be limited thereby. The present invention contemplates all embodiments within the scope of the present application, taken in the light of the prior art.

What I claim is:

1. The method of making an adhesive composition which comprises placing a plastic rubber material in a heated, internal mixer, mixing such material while gradually adding thereto asphalt as a softening agent for the rubber, then after a smooth mix is attained adding sodium hydroxide solution thereto and continuing the mixing until a uniform batch is again attained, next some volatile solvent is added to reduce the viscosity of the batch, then after a smooth mix is attained water is added and the mixing continued until the same is substantially uniformly disseminated throughout the batch, and then additional amounts of volatile solvent are added, with continued mixing, to bring the resulting adhesive cement to predetermined viscosity or plasticity, the water being added in small proportion, not greater than about 10% by weight of the total weight of said volatile solvent, and said asphalt being added in amount by weight of ¾ to 1½ that of said rubber.

2. An adhesive cement of good tack and transferability and of high heat resistance in the form of the final dried film comprising rubber and asphalt having caustic soda intimately intermixed therewith, said caustic soda being present in amount by weight of 0.5 to 5 percent of that of said rubber, the whole being dissolved in a volatile hydrocarbon solvent, and water in small proportion, not greater than about 10 percent by weight of said solvent, being finely dispersed throughout the rubber-asphalt solution described, said asphalt being present to the extent by weight of ¾ to 1½ that of said rubber.

3. As an adhesive composition, a solution comprising rubber and asphalt dissolved in a volatile solvent, with an alkali hydroxide present in amount by weight of about 0.5 to 5 percent of that of said rubber, said asphalt being present to the extent by weight of ¾ to 1½ that of said rubber, and water in the proportion of 2½ to 10 percent of that of said volatile solvent being dispersed as small, discrete particles throughout said solution.

4. An adhesive composition comprising rubber and asphalt blended together and having aqueous alkali hydroxide intimately intermixed therewith, the alkali hydroxide content being 0.5 to 5 percent by weight of that of said rubber, the whole being dispersed in a volatile solvent to form a viscous liquid adhesive, with water as small discrete particles disseminated therein, said water being present to the extent of about 2½ to 10 percent of said volatile solvent, and said asphalt being present in the order of ¾ to 1½ that of said rubber, by weight.

5. A rubber-containing adhesive having a bonding period for attaching fibrous or absorptive elements to smooth metal surfaces of from 5 to 10 minutes under normal room temperatures and humidity, and having a good tack and transferability during such time, and having a sufficiently high heat resistance in the final dried film that such film has a softening point of the order of at least 185° F., said adhesive including a blend of rubber and asphalt dissolved in a volatile solvent, with a small amount of water, not exceeding approximately 10 percent of that of said solvent, disseminated therein in small, discrete particles, said asphalt being present in the order of ¾ to 1½ that of said rubber, by weight, and the amount of said volatile solvent being greater by weight than said rubber.

6. An adhesive cement having utility as a roof pad cement in auto body construction and for other purposes which has a bonding period for attaching a fibrous, absorptive roof pad to a smooth, metal surface of at least about 6.5 minutes under normal room temperatures and humidity and which, in the form of the final dried film, has a softening point of more than 200° F. which comprises a mixture of reclaimed rubber and a substantially non-saponifiable asphaltic softening agent therefor, neither exceeding the other in weight by more than 50%, aqueous sodium hydroxide intimately intermixed with said rubber and asphaltic softening agent in quantity such that the NaOH content thereof is at least 0.5 percent and less than 5% of the weight of said rubber, said composition being dissolved in an amount of a substantially non-saponifiable hydrocarbon solvent substantially greater by weight than said reclaimed rubber, the solution so constituted being of viscous nature and having water dispersed as small, discrete particles throughout the same, said water being present to an extent by weight of the order of 5% of that of the aforesaid hydrocarbon solvent.

7. An adhesive composition as herein described and illustrated having good viscosity ageing during storage, having good tack retention and transferability after application as a thin coating to a surface, having a high wet strength, being substantially free of tendency to form a skin during drying and possessing the property of drying approximately uniformly throughout the depth of the film or coating and having high heat resistance and being elastic and resilient in the form of the final dried film, said adhesive composition comprising a compatible blend of rubber and asphalt containing aqueous sodium hydroxide in small amount, the NaOH content thereof being about 2 percent of the weight of said rubber, said blend being dissolved in a volatile organic solvent to provide a viscous solution, with from 2½ to 10 percent of water, based upon said solvent, disseminated in said solution as small discrete particles, said asphalt being present in the proportion of approximately ¾ to 1½ that of said rubber, by weight, and the amount of said volatile solvent being greater by weight than said rubber.

8. An adhesive composition comprising a plastic, workable blend of rubber and a substantially non-saponifiable asphaltic hydrocarbon as a softening agent therefor, having alkali hydroxide present to the extent by weight of ½ to 4 percent that of said rubber, dissolved in a volatile solvent to provide a viscous liquid adhesive, the amount of said solvent being greater by weight than said rubber, and water in the proportion of 2½ to 10 percent of said solvent disseminated in said viscous liquid adhesive as small discrete particles, said asphaltic hydrocarbon agent being in the proportion by weight of ¾ to 1½ that of said rubber.

9. A solvent type adhesive composition comprising a uniform mixture of rubber and an asphalt as a softening agent therefor, having alkali hydroxide present to the extent by weight of about 0.5 to 5 percent of that of said rubber, dissolved in a volatile hydrocarbon organic solvent to provide a viscous solution, said asphalt being present to the extent by weight of ¾ to 1½ that of said rubber, and the amount of said volatile solvent being substantially greater by weight than said rubber.

10. An adhesive composition comprising a mixture of rubber, an asphaltic hydrocarbon material as a softening agent therefor, and sodium hydroxide in the amount of about 0.5 to 5 percent of the weight of said rubber, dissolved in a volatile hydrocarbon solvent and containing a minor proportion of ethyl alcohol as an agent adapted to reduce the gel structure or static viscosity of the rubber solution, said asphaltic hydrocarbon material being present to the extent by weight of approximately ¾ to 1½ that of said rubber and the amount of said hydrocarbon solvent being greater by weight than said rubber.

11. An adhesive composition for uniting fibrous material to metal or like surfaces having good bonding qualities over a period of more than five minutes and having sufficient heat resistance in the form of the final dried film to hold silencer pads in place on the roof of an auto body at temperatures up to 250° F., said composition comprising an intimate mixture of reclaimed rubber, an asphaltic hydrocarbon material as a softening agent therefor and an aqueous basic alkali metal compound in the amount of 0.5 to 5 percent by weight of said reclaimed rubber, dissolved in a volatile solvent, with a small amount of water not exceeding 10 percent by weight of that of said solvent disseminated as small, discrete particles throughout the resulting solution, neither said reclaimed rubber nor said asphaltic hydrocarbon material exceeding the other in amount by more than 50 percent, and said volatile solvent being present to an extent by weight greater than said rubber.

EARL S. KNORR.